H. A. RIGGS.
CENTRIFUGAL SEPARATOR OR CLARIFIER.
APPLICATION FILED MAY 3, 1916.
1,271,367.
Patented July 2, 1918.
2 SHEETS—SHEET 2.
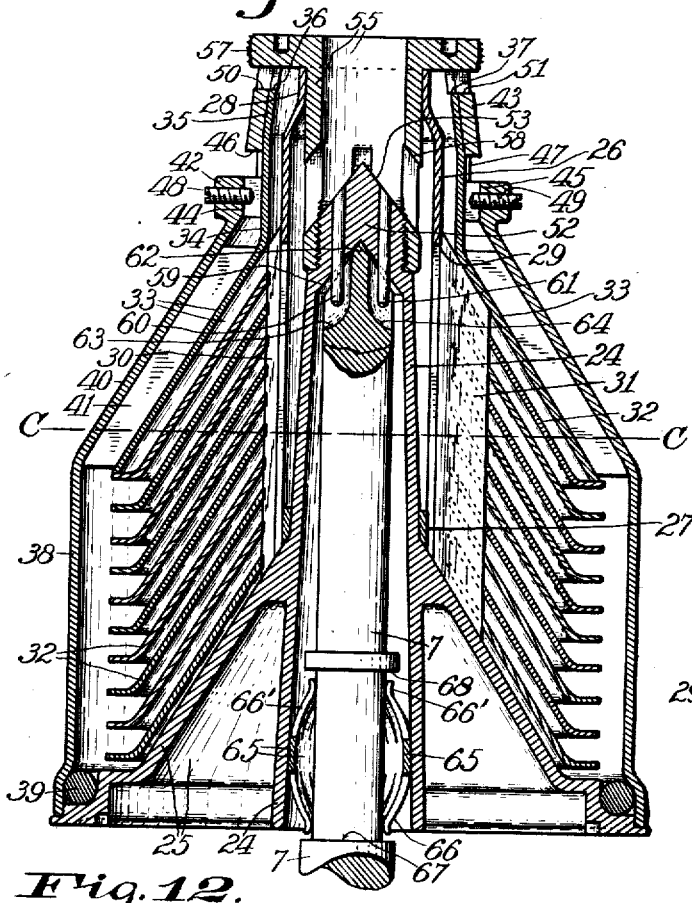
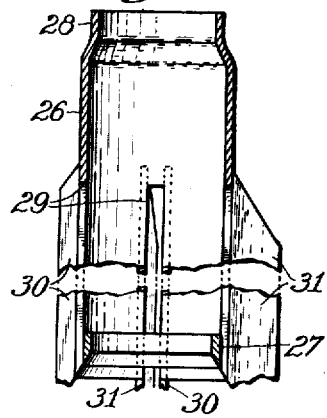
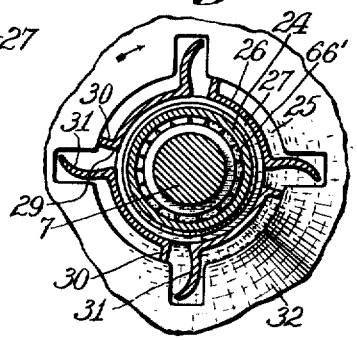
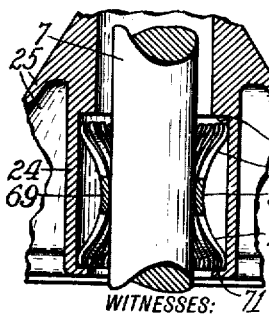
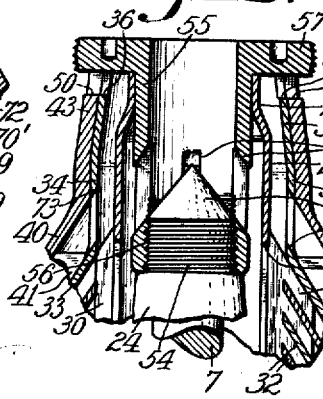
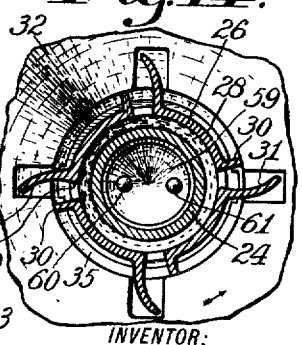

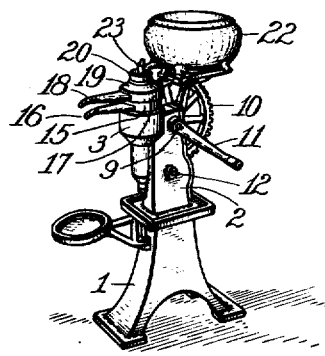
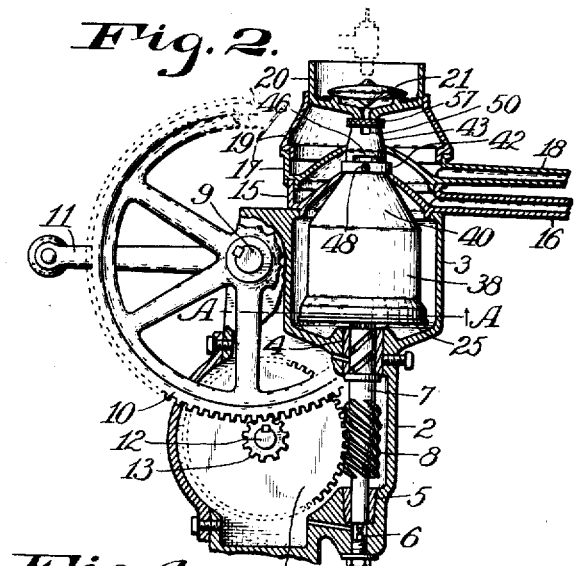

UNITED STATES PATENT OFFICE.

HORACE A. RIGGS, OF INDIANAPOLIS, INDIANA.

CENTRIFUGAL SEPARATOR OR CLARIFIER.

1,271,367.   Specification of Letters Patent.   Patented July 2, 1918.

Application filed May 3, 1916.  Serial No. 95,120.

*To all whom it may concern:*

Be it known that I, HORACE A. RIGGS, a citizen of the United States, residing at Indianapolis, in the county of Marion and State of Indiana, have invented a new and useful Improvement in Centrifugal Separators or Clarifiers, of which the following is a specification, reference being had to the accompanying drawings and to the letters and figures of reference marked thereon.

This invention relates to centrifugal separators that are designed for separating the butter fat from milk, and which, with slight modification in structure, are adapted to be used as clarifiers, the invention having reference more particularly to a type of separating machine having separating apparatus removably mounted on and rotated by a vertical shaft; the invention relating also and more especially to structural improvements, in machines of the above-mentioned class, involving the mounting and operation of the separating apparatus, to overcome or eliminate the mechanical deficiencies inherent in machines hitherto produced. The invention relates also particularly to improvements in centrifugal bowl separators described in my application for Letters Patent filed January 7, 1916, Serial Number 70,762, of which the present is a divisional application, in so far as the subject-matter is common to both applications.

In order to obtain close separation of butter fat from milk by centrifugal force, it is necessary to revolve the bowl or separating device from seven-thousand to twelve-thousand revolutions per minute, depending upon the design, construction, and interior arrangement of parts of the respective bowls, used in the various types of machines in general use. The skimming efficiency of the different types of separators heretofore produced is greatly impaired if the bowls thereof are permitted to "get out of balance", as a certain defect is termed, which condition may result from a fall or shock when disuniting the parts of the bowl for cleaning purposes, or may naturally follow the continued use of the machine as the different parts or contents of the bowl more firmly or compactly settle into position, thus entailing enormous waste of butter fat or necessitating the return of the bowl to the factory for re-balancing at great expense to the owner. The skimming efficiency of the common types of bowls is also impaired if the machines are not set absolutely level, as otherwise excessive vibration of the bowl and loss of butter fat would result. In order to reduce vibration of the bowl as much as possible in an effort to avoid such loss, it is therefore necessary to observe that the bowl be not only carefully balanced when manufactured, but that the separator (or clarifier) be set in an absolutely vertical position when ready for use. Even when the above-mentioned conditions have been observed and remedial precautions taken, vibrations of the bowl in the common types of separators are not entirely overcome, especially when the machine is operated by hand and consequently the power applied unevenly.

As it has previously been found impossible to meet or overcome vibrations of the bowl (or skimming device) under the various conditions following the unsatisfactory use of said machines (entailing loss of butter fat in the skim milk), numerous devices have been produced and commonly termed "flexible" or "spring-supported" neck bearings, set in the frame of the machines, through which the bowl spindle or bowl-supporting and driving shaft is inserted, with the purpose of cushioning or reducing the jar of the bowl and making the vibrations less noticeable to the operator, with but little, if any, increase in bowl-skimming efficiency.

Inasmuch as the bowls in the common types of separating machines are in effect pivoted at the lower end of the bowl spindle, or bowl-supporting and driving shaft, (whether the shaft is formed as a part or lower extension of the bowl, or closely fitted therein,) when pressure is applied on the driving crank and through the gears, the bowl is pushed slightly off its pivoted center, as a result of the yielding of the spring-supported or flexible neck bearing above referred to which inaccurately guides the bowl spindle, by the thrust or impinge of the intermediate gear against the bowl spindle.

In order to avoid the numerous difficulties and mechanical imperfections enumerated above, the object being to attain improved results in operation, I have provided an improved and self-balancing bowl or separating apparatus in cream separators or clarifiers by yieldingly supporting such bowl in a novel manner on the upper end of the bowl spindle or driving shaft, the supporting point being above the center of gravity of said bowl, and so that the major portion of weight of the bowl is loosely suspended below the supporting point, so that the force of gravity insures balancing, steadiness, and efficiency of operation of the bowl at all times. This construction also permits the use of the desired rigid or fixed bearings for the bowl spindle and prevents excessive wear of the gears by holding the gears in proper mesh when operating, which result cannot be obtained when the bowl spindle is mounted in a yielding upper bearing allowing the gears to go out of the pitch line of mesh and cramping the spindle in its lower bearing, further causing the machine to run hard.

An important feature of the present invention relates to the improved results obtained by the use of a cone-shaped bowl center and an improved form of costated distributing tube placed coadjutant to the conical bowl center of the machine, for regulating and equably distributing the flow of milk or liquids in like quantity between each of the truncated conical disks, and thus avoiding the common defect inherent in other separators of overtasking the capacity of some of the disks adjacent to the distributing inlets to the bowl and thereby clogging those disks, while the disks remote from the inlets are not properly supplied and the efficiency of the separator is correspondingly reduced.

As a further precaution for the purpose of insuring an even distribution of milk between the disks of the bowl, I have preferably formed a channel or recess in the longer ribs against the direction of rotation of the feed tube, so that the liquids will fill and evenly overflow this channel and supply all disks alike; and I have further provided a plurality of short ribs adjacent to longer ribs of the feed tube and coöperative therewith, the short ribs allowing the cream globules to immediately flow into the cream zone adjacent to the feed tube and the inner periphery of the disks.

An object of the invention also is to improve the construction of the separating apparatus so as to induce sanitary practices in the operation and care of machines designed for separating butter fat from milk.

With the above-mentioned, and other objects which will hereinafter clearly appear, in view, the invention consists essentially and more specifically in providing a gravity-balancing centrifugal separating apparatus structure having a non-yielding supporting and operating shaft; the invention consisting also further in the novel parts, and in the combinations and arrangements of parts, as hereinafter particularly described and further defined in the appended claims.

Referring to the drawings, Figure 1 is a perspective view of a cream separator of popular type to which the invention is applied to indicate the character of apparatus with which the invention is most advantageously incorporated; Fig. 2 is a fragmentary elevation of the cream separator partially in vertical section; Fig. 3 is top plan of the bowl or separator device of the machine; Fig. 4 is a perspective view of the upper or neck portion of the separator shell; Fig. 5 is a fragmentary section approximately on the line A A on Fig. 2 looking upward; Fig. 6 is a central section of the cap and feed-tube connected to the bowl center, of which the upper portion is shown, as being mounted on the upper portion of the supporting shaft of the bowl or separating apparatus, being on the plane of the line B B on Fig. 3; Fig. 7 is a perspective view of an improved cushion or shock-absorber preferably employed in the construction of the improved machine; Fig. 8 is a perspective view of the improved cushion or shock-absorber slightly modified as to details; Fig. 9 is a vertical section on line B B on Fig. 3; Fig. 10 is a fragmentary section also on the line B B; Fig. 11 is a fragmentary section approximately on the line C C on Fig. 9 looking downward; Fig. 12 is a fragmentary section also on the line B B but slightly modified as to details; Fig. 13 is a fragmentary section, as on the line B B but slightly modified to adapt the apparatus for use as a clarifier of liquids; and, Fig. 14 is a fragmentary section approximately on the line C C on Fig. 9 looking upward.

Similar reference characters on the different figures of the drawings indicate corresponding elements or features of construction herein referred to.

The machine illustrated for descriptive purposes comprises a base or stand 1 on which is a main frame 2 supporting a casing 3 and a stationary journal box 4 at the bottom of the casing, and also another stationary journal box 5 in a lower position, a shaft-end bearing 6 being supported by the frame below the lower box. A separator shaft 7 is rotatably mounted in the journal boxes 4 and 5 with its lower end upon the bearing 6, and it has spiral gear teeth 8 thereon between the journal boxes. A main shaft 9 is rotatably mounted in the main frame and has a gear wheel 10 secured thereto, and when the machine is designed to be operated by hand the shaft 9 is provided with a crank 11. A counter-shaft 12 is mounted also in the frame and has a pinion 13 and a gear wheel 14 secured thereto, the pinion being in mesh with the wheel 10, the wheel 14 being in mesh with the gear teeth 8 of the shaft 7. The shaft 7 being mounted in firmly supported journal boxes is not vibrated by the driving action of the wheel 14. A pan 15 is removably supported upon the casing 3 to receive the skimmed milk and has a spout 16 thereon, the pan removably supporting another pan 17 to receive the cream separated from the milk and discharge it through a spout 18 connected to the pan. The pan 17 has a removable cover 19 which supports a feed-cup 20 usually having a float 21 therein to automatically control the flow of the milk from the vessal 22 supported on the frame and having a faucet 23 arranged above the float, the latter features being well known.

The separating apparatus comprises a hollow bowl center 24 of improved form and larger than the shaft 7 in diameter, so that when the shaft is supporting the bowl and not supported in exactly vertical position the bowl is not forced out of balance or level position. Preferably the center is slightly conical or tapered so as to have an inclined exterior presented to the liquid to be acted upon.

An apparatus of the character set forth comprises various well-known elements, as a bowl bottom 25 fixed to the bowl center, a shell, separating disks, and variously formed passages for the liquid.

In the present case a distributing-tube 26 of improved construction is provided that is greater in diameter than the bowl center 24 and extends about the center from the bowl bottom upward and to a plane above the center, the lower portion of the tube having a lining 27 therein that is in contact with the bowl center for centering the tube. The upper end of the tube has a contracted or conoidal neck 28. The main portion of the tube has vertical slots 29 in its wall and also a radial wing 30 on one side and a relatively broader wing 31 that is curved to form a vertical channel on the opposite side of each slot. A suitable number of conical separating-disks 32 are superimposed upon the bottom of the bowl in spaced apart arrangement and extend outward from the wings 30, being slotted to receive the wings 31. The uppermost one of the disks supports a cover 33 having a neck 34 that is greater in diameter and extends about the tube 26 above the disks, the neck of the cover preferably having a tapered or conoidal upper portion 35 in the upper end of which are slots 36 and 37 for the escape of liquid. The shell of the bowl comprises a cylindrical portion 38 having connection with a packing ring 39 supported by the bottom of the bowl, and a conical top portion 40 provided with spacers 41 that extend to the cover 33. The shell has a neck 42 having a tapered or conoidal upper portion 43 that embraces the tapered portion 35. In some cases the neck 42 has a relatively thicker wall than the remaining portions of the shell, the inside of the wall of the neck having vertical channels 44 and 45 that communicate with the space under the conical portion 40 of the shell and extend upward to slots 46 and 47 respectively that are formed in the wall for the escape of liquid. Regulator plugs 48 and 49 are screwed into the neck 42 for the purpose of partially closing the channels 44 and 45 respectively. The top end of the tapered portion 43 of the neck has slots 50 and 51 therein that are in register with the slots 36 and 37, respectively.

In order to improve the internal structure of the bowl, more especially in the interest of sanitation, the bowl center 24 is provided with a closure head 52 on its top that has a conical top face 53. The head is provided with external screw-threads 54 to which a novel locking device is connected, the device comprising a feed-tube 55 having internal screw-threads 56 for engaging the screw-threads 54, the tube being inserted in the contracted neck portion 28 of the distributing-tube in contact therewith and having a cap flange 57 thereon that extends over and in contact with the tops of the neck portions 28, 35 and 43, thus normally locking the different parts of the bowl together and permitting convenient disuniting of the parts for cleansing purposes. The tube 55 has apertures 58 therein adjacent to the inclined top 53 which evenly divides the liquid to the apertures when received into the tube.

In order to pivotally support the bowl or separator apparatus so that it shall be free to hang in level position whether its supporting shaft is exactly vertical or is slightly inclined, the under side of the head 52 has a socket 59 therein which preferably is conical in contour so as to be self-centered on its support, and two driving pins 60 and 61 are fixed to the head and extend downward into the socket. The separator shaft 7, which is sufficiently long to extend upward in the bowl center 24 to the head 52, the latter being located adjacent to the higher portion of the uppermost one of the separator disks, has a conical top 62, so that a pivotal centering point is provided, the upper portion of the shaft having recesses 63 and 64 therein adjacent to the periphery of the shaft to receive the driving-pins 60 and 61. The driving devices, however, that enable the shaft to rotate the apparatus are not of necessity constructed exactly as described.

In some cases a cushion or shock-absorber may be desired to prevent unnecessary and undesirable oscillation of the bowl on its shaft, or to absorb the shock in case the bowl is accidentally thrust sidewise, and such cushioning devices may suitably comprise a collar 65 from which spring-fingers 66 and 66' extend, the collar constituting the middle portion of a plurality of bow-shaped springs connected together by the collar, the collar extending about the shaft and in contact with the inside of the bowl center 24, the ends of the spring-fingers being in contact with the shaft which is provided with shoulders 67 and 68 to keep the springs in proper place near the lower end of the bowl center.

In some cases the cushion may be composed of a collar 69 placed in contact with the shaft and having spring-fingers 70 and 70′ thereon extending to the inside of the bowl center 24, the latter having shoulders 71 and 72 for holding the springs in proper position in the lower portion of the bowl center.

When the separator is not designed for separating cream from whole milk, but is desired to be used for clarifying purposes, the neck 42 is devoid of the outlet channels, and the neck 34 has apertures 73 and 74 therein so as to form passages from the space under the conical portion 40 of the shell to the space between the tube 26 and the neck 35, so that all the liquid may escape together through the apertures 50 and 51 while the sedimentary matter gravitates to the bottom of the bowl.

The machine, as will be understood, is set so that the separator shaft 7 shall be upright, but in most cases in practice the user is unable to secure accurate perpendicularity of the separator shaft but can only approximate such arrangement. In the present case while the shaft is rotated, although in slightly inclined position, the separator bowl constantly finds its level automatically on its pivotal support, through the force of gravity, with the result that uniform distribution of the liquid in the separator is attained and the loss of butter fat is avoided. In operation, as will be understood, the whole milk is fed into the tube 55, deflected evenly through the apertures 58 to the inside of the distributing-tube 26, and thence through the slots 29, being uniformly distributed by the channeled wings 31 to all the disks, the separation occurring very thoroughly between the separator disks. The butter fat or cream is forced out of the apertures 50 and 51 while the skimmed milk is forced through the channels 44 and 45 and the apertures 46 and 47. The thickness or richness of the cream may be varied by means of the plugs 43 and 49 which act as valves in the adjacent channels, as will be understood. It should be understood that the cushion between the separator bowl and its shaft is sufficiently weak to permit the loaded separator bowl to automatically adjust itself to balanced level position in operation. It will be noted that the circular channel or aperture adjacent the upper disks is greater correspondingly than the aperture opposite the lower disks, and consequently the supply of milk or fluids is thereby restricted to a certain extent to the lower disks to compensate for the greater pressure caused by the height of the body or column of milk or liquids within the distributing tube.

Having thus described the invention, what is claimed as new is:—

1. A centrifugal separator or clarifier including a hollow tapering bowl center with its smaller end uppermost provided with a head having a conical top face, a feed-tube embracing and secured to the head and having apertures therein at the lower portion of the conical face of the head, and a distributing tube seated on the larger portion of said center and having an upper portion arranged opposite to said apertures.

2. A centrifugal separator or clarifier including a hollow tapering bowl center provided on its top with a solid head having a conical top face, a distributing tube on the bowl center embracing the lower portion thereof and having a neck portion on its upper end that is relatively smaller in diameter and arranged at a greater elevation than the apex of the conical top face, and a feed-tube extending through the smaller neck portion in contact therewith and being connected to the head, the wall of the feed-tube having apertures therein at the lower portion of the conical top face.

3. A centrifugal separator or clarifier comprising a hollow tapering bowl center provided on its top with a solid head having a conical top face, a distributing tube on the bowl center separably embracing the lower portion thereof and having a neck that is relatively smaller in diameter, a disk cover extending about the distributing tube and having a neck thereon in the top of which are slots, and a feed-tube extending through the smaller neck of the distributing tube in contact therewith and being connected to the head, the feed-tube having apertures therein at the lower portion of the conical top face, the feed-tube having also an imperforate flange thereon covering the upper ends of said slots and engaging the tops of the necks to deflect liquid to and through the slots.

4. A centrifugal separator comprising a hollow bowl center provided with a closure head, a distributing tube extending about the bowl center and to a plane above the apex of the conical top face, the top of the tube having a relatively small neck diametrically, a disk cover extending about the distributing tube and having a neck thereon provided in the top thereof with slots, a shell having a neck with openings therein, the neck of the shell embracing the neck of the disk cover and provided in its top with slots registering with the slots in the neck of the disk cover, and a feed-tube extending through the neck of the distributing tube and being connected to the closure head, the feed-tube having apertures therein at the top of said head and having also an imperforate flange thereon in engagement with the tops of said necks and extending continuously across the tops of said slots.

5. In a centrifugal separator or clarifier, a bowl shell having a conoidal neck portion, a divider having a conoidal neck portion, and a locking device engaging the bowl shell for uniting said portions.

6. In a centrifugal separator or clarifier, a bowl shell having a conoidal neck portion for tapered engagement with the neck portion of a divider, and a locking device for uniting the bowl shell neck and the neck portion of the divider to form a leakproof contact joint.

7. In a centrifugal separator or clarifier, a bowl shell having a conoidal neck portion for encompassing a conoidal divider neck portion, in combination with a locking device comprising a threaded feed tube having an annular flange or cap for drawing the conoidal neck portions into positive engagement.

8. In a centrifugal separator or clarifier, the combination of an upright rotatable bowl center, a feed-tube secured to the upper portion of said center and having apertures in the wall thereof, a distributing tube extending about said center and having slots in the wall thereof below the plane of said apertures, the lower portion of the distributing tube embracing said center and the upper portion having a relatively narrow neck embracing said feed-tube above said apertures, said distributing tube having radial wings thereon at one side of the slots that are curved to constitute vertical channels at the outside of the slots, the distributing tube having also wings opposite to the concave side of the curved wings and conical disks extending about the distributing tube and having openings receiving said wings.

9. In a centrifugal separator or clarifier, the combination of an upright bowl center rotatably supported and a bowl bottom thereon, the center being conical externally and provided with a head having a conical top face, a feed-tube connected to the bowl center and having apertures adjacent to the conical top face, a distributing tube extending about said center with the lower portion of the tube in embracing relation with the exterior of said bowl center, the upper portion of said distributing tube having a relatively narrow neck embracing the exterior of said feed-tube, said distributing tube having vertical slots therein, a plurality of separator disks extending about said distributing tube and having openings therein adjacent to the tube and ribs on one side of the openings, a shell on the bowl bottom and a plurality of guide devices extending from the bowl bottom upward through said openings, each guide device having a vertical channel in one side thereof for conducting liquids vertically from said slots and distributing the liquids between the plurality of disks.

10. In a centrifugal separator or clarifier, the combination of a bowl center, a feed-tube embracing the bowl center, a distributing sleeve having a conoidal portion embracing the feed-tube and having also a vertical slot therein, vertical ribs on the sleeve adjacent to the slot, one of the ribs extending radially farther than the other, and skimming devices on said sleeve.

11. In a centrifugal separator or clarifier, the combination of a bowl center, a feed-tube embracing the bowl center, a distributing sleeve having a conoidal portion embracing the feed-tube and having also vertical slots in the wall thereof, and vertical ribs arranged in pairs adjacent to the slots, one rib of each pair having a transversely-curved concave face presented toward the opposite rib of the pair.

12. In a centrifugal separator, a feed-tube, a distributing sleeve superimposed upon the feed-tube and having discharge ports therein, and outwardly extending ribs arranged in pairs adjacent to the ports in the distributing sleeve and forming channels therein, one rib of each port channel being of less radial diameter than the opposing rib to give free entrance of the cream into the cream zone at inner periphery of the skimming devices surrounding said sleeve.

13. In a centrifugal separator or clarifier, the combination of an upright bowl center, a feed-tube secured to the upper portion of said center and having apertures in the wall thereof, a distributing tube extending about said center and having slots in the wall thereof, the distributing tube having a conoidal neck portion embracing the feed-tube above said apertures, wings on the distributing tube at said slots, and disks extending about the distributing tube and the wings.

14. In a centrifugal separator or clarifier the combination of an upright bowl center, a feed-tube secured to the said center and having apertures in the wall thereof, a distributing tube extending about said center and having slots in the wall thereof, the distributing tube having a portion embracing the feed-tube above said apertures, guide wings radially arranged on the distributing tube on one side of said slots, spacing wings that are radially shorter than the guide wings and arranged on the distributing tube on the opposite side of said slots, and annular disks extending about the distributing tube in guiding contact with the spacing wings, the inner edges of the disks having openings receiving only the guide wings.

15. In a centrifugal separator or clarifier, the combination of an upright bowl center rotatably supported and a bowl bottom thereon, the center being conical externally and provided with a head having a conical top face, a feed-tube connected to the bowl center and having apertures adjacent to the conical top face, a distributing tube extending about said center with the lower portion of the tube in embracing relation with the exterior of said bowl center, the upper portion of said distributing tube having a conoidal neck portion embracing the exterior of said feed-tube, said distributing tube having vertical slots therein, and a divider having a conoidal neck portion extending about the conoidal neck portion of the distributing tube at a distance therefrom.

16. In a centrifugal separator or clarifier, the combination of a distributing tube with vertical slots therein, the tube having radial ribs on one side of the slots and having also wings on the opposite side of the slots, the wings being radially longer than the ribs, annular disks on the distributing tube and having slots in the inner edges thereof receiving the wings, the inner edges of the disks having guiding contact with said ribs, with a bowl shell, and means for conducting liquid into the distributing tube.

17. In a centrifugal separator or clarifier, the combination of a bowl center, a head on the center having a conical top face, the head having external screw threads below the lower end of the conical face, and a feed-tube having internal screw threads engaging the screw threads of said head, the feed-tube having vertical slots in its wall adjacent to the said conical top face, the bottoms of the slots being inclined and constituting continuations of said top face, with a bowl shell, and a distributing tube in the shell embracing the feed-tube above said slots.

18. In a centrifugal separator or clarifier, the combination of a bowl center, a separate slotted distributing tube on the bowl center comprising a thin wall of uniform thickness and extending upward beyond the center and having a neck on the top thereof that is less in diameter than the body portion of the tube, and a separate feed-tube extending through said neck in close contact therewith and connected with the upper portion of the bowl center, the feed-tube having apertures in its wall below said neck, with a bowl shell, and distributing disks.

19. In a centrifugal separator or clarifier, the combination of a disk cover provided with a neck having a tapering upper portion, the top of the tapering portion having slots therein, a shell top provided with a neck having a tapering upper portion closely embracing the tapering portion of the neck of the disk cover and having slots in its top registering with the other described slots, the neck of the shell top having openings in its wall, a bowl center, and a separate slotted feed-tube connected to the bowl center and having a continuous flange engaging the tops of said necks and extending over the upper ends of said slots, with a separate distributing tube having a conoidal neck embracing the feed-tube, and disks on the distributing tube.

20. In a cream separator bowl, the combination of a central tube, a base portion encircling the tube, a slotted distributing device encircling the central tube at a graduate distance therefrom, truncated disks on the distributing device, ribs on the distributing device engaging the truncated disks and providing a free passage for the cream between the periphery of the central tube and ribs and the disks, a bowl shell, and means for feeding milk into the bowl shell.

21. In a centrifugal separator or clarifier, a bowl shell having a conoidal neck portion, a divider plate having a conoidal neck portion mounted wholly within the bowl shell, and a screw device for uniting the conoidal neck portions of the bowl shell and divider plate, and holding the base portion of the divider plate in spaced-apart arrangement with the walls of the bowl shell.

22. In a centrifugal separator or clarifier, a bowl shell having a conoidal neck portion, and a divider plate having a conoidal neck portion mounted within the neck portion of the bowl shell, in combination with a locking nut engaging the tops of the bowl shell and divider plate neck portions, the said locking nut having an extension forming a detachable feed tube for the liquids entering the bowl shell.

23. In a centrifugal separator or clarifier, a feed-tube, a distributing device detachably mounted on the feed tube, said device having a vertical slot in its wall and a radially disposed rib on one side and a relatively broader wing on the opposite side of said slot.

24. In a centrifugal separator or clarifier, a feed-tube, a distributing device detachably mounted on the feed tube, said device having a vertical slot in its wall and a radially disposed rib on one side and a relatively broader wing that is curved to form a vertical channel on the opposite side of said slot.

25. In a centrifugal separator or clarifier, a feed-tube, a distributing device detachably mounted on the feed tube, said device having vertical slots in its wall and a radially disposed rib on one side and a relatively broader wing that is constructed to constitute an open vertical channel on the opposite side of each slot, said slots constituting conduits from a milk-receiving chamber to said channels.

26. In a centrifugal separator or clarifier, a distributing sleeve having a vertical slot, a series of separator plates mounted upon the distributing sleeve, vertically disposed ribs arranged in pairs formed on the distributing sleeve adjacent to the vertical slot, one of the ribs being of less radial diameter than the inner periphery of the separator plates and the opposing rib extending beyond the cream zone and penetrating the inner periphery of the plates.

27. In a centrifugal separator or clarifier, a series of liner plates, a feed tube, a distributing sleeve superimposed upon the feed tube and having a vertical slot therein, and vertical ribs arranged in pairs adjacent to the slot in the distributing sleeve, one of which ribs is of less radial diameter than the opposing rib and forms a guide for the liner plates.

28. In a centrifugal separator or clarifier, a detachable feed tube having an annular cap flange, a plurality of skimming devices, a distributing sleeve superimposed upon the feed tube and having vertical slots therein and vertical ribs arranged in pairs adjoining the slots in the distributing sleeve, one rib of each pair forming a vertical channel for distributing the liquid evenly to skimming devices and penetrating the inner periphery of the skimming devices beyond the cream zone.

29. In a centrifugal separator or clarifier, a detachable feed tube having an annular cap flange, and a plurality of skimming devices, in combination with a distributing sleeve superimposed upon the feed tube and having vertical slots therein and vertical ribs arranged in pairs adjoining the slots in the distributing sleeve, one rib of each pair forming a vertical channel for distributing the liquid evenly to the skimming devices beyond the cream zone, and the opposing rib being of less radial diameter forming a guide for the skimming devices at their inner periphery and a wall for the cream zone.

30. In a centrifugal separator or clarifier, the combination of a bowl stem, a distributing sleeve encompassing the bowl stem at a graduate distance therefrom, vertically disposed discharge ports in the distributing sleeve, vertical ribs and wings arranged in pairs formed on the distributing sleeve adjoining the discharge ports, one wing of each pair forming a vertical open gutter or channel for evenly delivering the liquid to disks or plates connecting with the discharge ports and the opposite rib forming a guide for the disks, and means for feeding liquids into the discharge ports and disks.

31. In a centrifugal separator or clarifier, a hollow conoidal bowl center, and a feed-tube detachably connected with said bowl center, in combination with a distributing sleeve having vertically disposed ports therein at a graduate distance from the bowl center, vertical ribs arranged in pairs adjoining the ports, one rib of each pair acting as a conveyer of the liquid and the other rib forming a guide for disks or plates connecting with the ports in the distributing sleeve.

32. In a centrifugal separator or clarifier, a hollow conoidal bowl center, and a feed-tube detachably connected with said bowl center, in combination with a detachably mounted distributing sleeve encompassing said feed tube and bowl center at a graduate distance therefrom, and means coöperating with discharge ports in said distributing sleeve to supply liquid equally to a multiple of disks, plates or truncated cones in spaced relation thereto, substantially as set forth.

33. In a centrifugal separator or clarifier, a distributing tube having a conoidal neck portion to elastically receive a feed-tube therein in leak-proof arrangement, the distributing tube having slots in its wall.

34. In a centrifugal separator or clarifier, a disk cover having a tubular neck, the neck having a conoidal upper portion to be engaged by a shell neck and a locking nut, the top of the conoidal portion having slots therein.

35. In a centrifugal separator or clarifier, a shell top having a hollow neck, the neck having a conoidal upper portion to receive a disk cover neck, the top of the conoidal portion having slots therein.

36. In a centrifugal separator or clarifier, a cylindrical distributing tube having a filling ring in its lower portion to embrace a tapering bowl center, the tube having slots in its wall and having also a conoidal upper portion to receive a feed-tube.

In testimony whereof, I affix my signature in presence of two witnesses.

HORACE A. RIGGS.

Witnesses:
J. H. HARTMAN,
E. T. SILVIUS.